Patented Oct. 7, 1947

2,428,590

UNITED STATES PATENT OFFICE 2,428,590

PRODUCTION OF ALLYL TYPE COMPOUNDS

Edward C. Shokal and Theodore W. Evans, Oakland, Calif., assignors to Shell Development Company, San Francisco, Calif., a corporation of Delaware No Drawing. Application September 1, 1942, Serial No. 456,962

8 Claims. (Cl. 260—497)

This invention relates to the production of allyl type compounds from olefins having a maximum of four carbon atoms. More particularly it relates to the oxidation of propylene and butylene to the corresponding alcohols and esters. A preferred embodiment of the invention comprises the catalytic oxidation of propylene to allyl alcohol by way of allyl acetate.

It is known that propylene or butylene vapor passed over selenium dioxide yield glyoxals (J. Chem. Soc. 1932; 2342–4; U. S. Patent 1,999,576). However, allyl alcohol has never hitherto been obtained from propylene by the use of selenium dioxide or in any other direct manner and the literature indicates that it cannot be done. (Z. angew. Chem. 54: 148 [1941]).

It has now been found, however, contrary to the teaching of the prior art, that allyl alcohol may be obtained from propylene by the process of catalytic oxidation. The success of the process is dependent upon the choice of catalyst and related reaction conditions strong enough to oxidize the propylene to allyl alcohol but not so drastic as to result in further oxidation or substantial production of carbon dioxide. Any oxidation catalyst may be adopted to the present purpose. For example, such catalysts as selenium dioxide, selenious acid, tellurium oxide or acid, lead tetra-acetate, sulfur trioxide, thallic oxide, thallic trichloride, selenates and tellurates of such metals as Tl, Hg, Cu, Ag, Pt, Pb, W, Fe, Mn and Ni may be employed either singly or in combination. Of such substances, those which act both as catalyst and oxidizing agent have been found to be particularly effective. A preferred group of compounds which act both as oxidizing agent and as catalyst are the oxides of sulfur, selenium and tellurium. Another preferred group of catalysts comprises the compounds of those metals which form addition compounds with olefins, such as thallium, selenium, tellurium, copper, mercury, silver, platinum, palladium, osmium, etc.

The oxygen containing catalysts may be utilized especially advantageously by dissolving them in a suitable solvent and dissolving or passing the gaseous propylene into the solution. This solvent may be an inert substance or substances such as dioxane, water, benzene, a saturated nitrile, saturated hydrocarbon and the like. Or the solvent may be an organic acid which enters into the reaction to form allyl ester which may then be hydrolyzed to allyl alcohol. The organic acid may be present in anhydrous or substantially anhydrous form such as glacial acetic acid or as acetic acid admixed with some acetic anhydride (or a similar mixture of their homologues). Or enough water to hydrolyze the ester may be present or formed in the solution, or be added as the allyl ester is formed or subsequent to its formation. Either the catalyst or feed may first be dissolved or suspended in the solvent and the other component then passed into the solution.

When lead tetra-acetate or sulfur trioxide is employed, the reaction is preferably executed without a solvent. With selenium or tellurium compounds, on the other hand, the reaction may be carried out advantageously in the liquid phase, although their use is not limited to this method. The other catalysts enumerated may be employed for either vapor or liquid phase reaction, in the latter case being utilized with a suitable solvent. In the vapor phase reaction, the gaseous propylene feed may be admixed with other gas such as air, nitrogen, steam, other oxides or peroxides or mixtures of various of these gases in suitable proportions and contacted with a solid fixed bed catalyst. Or in the alternative the catalyst may be pulverized and its powder commingled with the propylene or gaseous mixture by any suitable means, as for instance, by a vapor or liquid current or by mechanical agitation. Air mixed with the propylene may act both as a diluent and a supplier of oxygen.

Other variables in the process are the dilution and rate of flow of the propylene. These should be regulated with respect to the amount of carbon dioxide and allyl alcohol produced. If the oxidation is too rapid, all the propylene reacted will go to carbon dioxide and water. Hence the optimum conditions must be determined for each catalyst used and the corresponding set of conditions—i. e., temperature, dilution, rate of flow, time of contact, type of catalyst, pressure, type of solvent, etc. In general, a suitable overall range of temperature for the process is from about 50° C. to about 350° C. When the reaction is effected with one or more oxygen containing catalysts dissolved in a solvent, an advantageous reaction temperature is that at which the mixture may be refluxed.

The process may be further illustrated by reference to the use of selenium and tellurium oxygen-containing catalysts. These may be dissolved in one or more of the above enumerated solvents, such as a substantially anhydrous organic acid, for example, glacial acetic acid, to which may be added a small amount of acetic anhydride to take up water, the gaseous propylene being bubbled through the solution. When such solvents are employed, the intermediate ester (e. g. allyl acetate) is first formed and then this is hydrolyzed to allyl alcohol by water. Anhydrous conditions are not absolutely essential, however, and enough water may be present to hydrolyze the ester to the alcohol. Although the process is adapted to batch or intermittent performance, it is thus admirably fitted to a continuous procedure, the allyl alcohol being constantly removed as it is formed.

and the allyl alcohol mixture distilled off substantially as soon as produced. 110 grams of selenium dioxide were dissolved in 1400 ml. of glacial acetic acid and 100 ml. of acetic anhydride. Approximately 15.5 mols of propylene were passed into the liquid at a constant rate over a period of 24 hours while the temperature was maintained at 120–130° C.

The properties of the allyl alcohol/water azeotrope and of the allyl acetate obtained from these runs are shown in the following table:

|  | Allyl Acetate | | Allyl OH/$H_2O$ Azeotrope | |
|---|---|---|---|---|
|  | Found | Theory | Found | Theory |
| B. P. | 105–106°  | 103–104° | 88.6–89.0° C | 88.6. |
| Br. No. | 156 | 159.8 | 189.2 | 189. |
| Density $\frac{20}{4}$ | .927(4) | .928 | .895(22°) | .898 (22° and 69%). |
| R. I. N $n\frac{20}{D}$ | 1.404(5) | 1.40448 |  |  |

The reaction is advantageously effected at or near the boiling point of the solution; thus the solution may be continuously refluxed at atmospheric, reduced or even at increased pressure. Allyl alcohol boils at 96–97° C. and its azeotrope with 27.7% water boils at 87.5° C. Allyl acetate boils at 103°–104° C. Accordingly, if sufficient water is present (initially or by successive formation or addition) in the system to allow the continuous withdrawal as azeotrope of all the alcohol as formed, the reaction temperature may be maintained at a few degrees above this temperature. On the other hand, if the reaction is conducted under substantially anhydrous conditons (which may be desirable under some circumstances), the reaction mixture may be maintained a few degrees above the boiling point of the allylic ester which may then be continuously withdrawn as it is formed.

The process may be illustrated by the following examples, although no limitation of the invention is to be inferred therefrom. Various modifications will be suggested to one skilled in the art, such as preheating the propylene feed, immediately quenching the gaseous reaction products, the use of propionic acid and propionic anhydride or their homologues as solvents in place of acetic acid and acetic anhydride, etc.

*Example I*

110 grams of selenium dioxide were dissolved in 950 ml. of glacial acetic acid and 50 ml. of acetic anhydride in a glass flask and a total of 11.5 mols of propylene was passed into the liquid over a period of 14 hours, while the temperature was maintained at 100° C. After neutralization with 2 N sodium hydroxide, the allyl alcohol/water azeotrope was distilled from the reaction mixture.

*Example II*

Ten mols of propylene were passed into a solution made as in the previous example, in the same type of reactor, over a period of 13 hours while the temperature was maintained at 95—105° C. The solution was treated with caustic, the azeotrope distilled and the allyl alcohol produced was recovered as in the preceding example.

*Example III*

A flask equipped with a still to remove low boiling products as they were formed was employed While the foregoing description of the present invention has been made with particular reference to the oxidation of propylene, since this is the more difficult starting material, the same procedure can be employed to produce allyl type compounds, as for example, crotyl alcohol from butylenes.

The allyl type alcohols produced by the present process may be used in the preparation of various organic compounds. Allyl esters may be employed as solvents for numerous dilution or extraction purposes, as softeners for pyroxylin, cellulose esters and resins, in perfumery and pharmaceutical chemistry, etc.

We claim as our invention:

1. A process for the production of allyl acetate which process comprises reacting propylene with selenium dioxide dissolved in acetic acid at a temperature between about 95° C. and about 130° C.

2. A process for the production of allyl acetate which process comprises reacting propylene with selenium dioxide dissolved in substantially anhydrous acetic acid at a temperature between about 95° C. and about 130° C.

3. A process for the production of allyl acetate which process comprises heating a solution of propylene and selenium dioxide dissolved in acetic acid at a temperature near the boiling point of the mixture.

4. A process for the production of allyl acetate which process comprises heating a solution of propylene and selenium dioxide dissolved in substantially anhydrous acetic acid at a temperature near the boiling point of the mixture.

5. A proces for the production of an allyl ester which process comprises heating a solution of propylene and selenium dioxide dissolved in aliphatic carboxylic acid at a temperature near the boiling point of the mixture.

6. A process for the production of an allyl ester which process comprises heating a solution of propylene and selenium dioxide dissolved in substantially anhydrous aliphatic carboxylic acid at a temperature near the boiling point of the mixture.

7. A process for the production of allyl alcohol which process comprises heating an aqueous solution of propylene and selenium dioxide in an aliphatic carboxylic acid at a temperature near the boiling point of the mixture, until a substantial amount of the allyl ester of the aliphatic carboxylic acid is formed, adding sufficient water to the reaction mixture to hydrolyze the allyl ester of the aliphatic carboxylic acid formed in the reaction and to allow the withdrawal therefrom, as azeotrope, of the allyl alcohol formed by the hydrolysis and hydrolyzing the allyl ester and distilling an allyl alcohol-water azeotrope from the mixture.

8. A process for the production of allyl alcohol which process comprises heating an aqueous solution of propylene and selenium dioxide dissolved in acetic acid at a temperature near the boiling point of the mixture, neutralizing the reaction mixture with aqueous sodium hydroxide, hydrolyzing the allyl ester and distilling an allyl alcohol-water azeotrope from the reaction mixture.

EDWARD C. SHOKAL.
THEODORE W. EVANS.

REFERENCES CITED

The following references are of record in the file of this patent:

UNITED STATES PATENTS

| Number | Name | Date |
| --- | --- | --- |
| 1,917,179 | Young | July 4, 1933 |
| 1,999,576 | Riley | Apr. 30, 1935 |
| 2,150,657 | Mitscherling | Mar. 14, 1939 |
| 2,159,507 | Law et al. | May 23, 1939 |

FOREIGN PATENTS

| Number | Country | Date |
| --- | --- | --- |
| 109,014 | Germany | Feb. 14, 1900 |
| 109,015 | Germany | Feb. 16, 1900 |

OTHER REFERENCES

Stein, "Angewandte Chemie," vol. 54, pages 146–152 (1941).